3,528,857
ELECTROCHEMICAL DEVICE COMPRISING AN ELECTRODE CONTAINING NICKEL-COBALT SPINEL

Harry C. Lieb, Rockville Centre, and Harry G. Oswin, Chauncey, N.Y., assignors to Leesona Corporation, Warwick, R.I., a corporation of Massachusetts
No Drawing. Continuation-in-part of applications Ser. No. 165,212, Jan. 9, 1962, and Ser. No. 481,156, Aug. 13, 1965. This application Sept. 2, 1966, Ser. No. 576,818
Int. Cl. H01m $13/00$, $27/00$
U.S. Cl. 136—86                                3 Claims

ABSTRACT OF THE DISCLOSURE

An electrochemical device is described comprising an electrode containing a nickel-cobalt spinel having the formula $NiCo_2O_4$.

---

This application is a continuation-in-part of co-pending application Ser. No. 165,212 filed Jan. 9, 1962, now abandoned; and application Ser. No. 481,156 filed Aug. 13, 1965, now abandoned.

This invention relates to improved electrodes for use in electrochemical devices, and more particularly to porous catalytic electrodes comprising oxides of cobalt and nickel and, more particularly, spinels of cobalt and nickel, which possess excellent electrochemical activity, conduct an electrical current and are resistant to corrosion.

In the prior art, the micro-metallic type electrodes have been used extensively in electrochemical devices, including fuel cells, due to their superior catalytic activity. However, since electrodes are subjected to conditions highly conducive to corrosion in the normal operation of a fuel cell and certain other electrochemical devices, it is necessary to select metals possessing good corrosion resistant properties, as well as those having good catalytic characteristics. Thus, nickel electrodes, due primarily to their superior characteristics in the above areas, have been extensively employed. It has been found, however, that upon prolonged use in an electrochemical device, such as a fuel cell or electrolytic cell, an oxide film is formed on the surface of the nickel electrode which, while highly resistant to corrosive influences, is substantially electrically non-conductive. Therefore, in order to overcome the non-conductive properties of such electrodes, the formation of a lithium oxide-nickel oxide film on the electrodes has been suggested. These electrodes have been found to be resistant to the corrosive influences in the cell, while still being capable of conducting an electrical current.

It has now been found that improved electrochemical electrode characteristics can be obtained from structures comprising oxides of cobalt and nickel and, more particularly, spinels of cobalt and nickel. These structures possess excellent electrical conductivity and superior catalytic characteristics, while still being highly resistant to corrosion.

Accordingly, it is an object of the instant invention to provide an electrode for use in an electrochemical device having improved electrical conductivity.

It is another object of this invention to provide an electrode for use in an electrochemical device which is highly resistant to corrosion.

It is still another object of this invention to provide an electrode for use in an electrochemical cell which has improved catalytic activity.

These and other objects of the invention will become more fully apparent from the following detailed description with particular emphasis being placed on the illustrative examples.

The above objectives are accomplished by constructing a porous catalytic element from oxides of cobalt and nickel with at least part of the cobalt and nickel being present as a spinel. According to this specification, a spinel designates a compound of bi-valent and tri-valent metal atoms and may be represented by the general formula $AB_2O_4$ or $M^{II}M_2^{III}O_4$. In the present instance, A or $M^{II}$ is nickel and B or $M^{III}$ is cobalt. Surprisingly, it has been found that mixed oxides of cobalt and nickel, in the absence of the spinel structure, will not provide an improved performance of the same magnitude.

In general, the catalytic spinel is formed by dissolving soluble salts of nickel and cobalt in a suitable solvent. The salts are converted to the hydroxide, washed, and dried, and thereafter pulverized and heated in a suitable furnace. The powder is quenched to room temperature and again heated before compressing into its final form. Alternatively, it may be preferred to merely coat a pre-formed nickel electrode with a film or layer of the cobalt and nickel spinel by immersing the nickel structure in a solution of nickel and cobalt salts and thereafter forming the spinel as described above. Various modifications in the process can be made, provided a spinel of nickel and cobalt is obtained at least at the surface of the electrode.

The proper ratio of nickel oxide to cobalt oxide can be varied depending to some extent upon the heat treatment. For example, it has been found that good structures can be prepared starting with from about 75 parts cobalt to 25 parts nickel, or 50 parts cobalt to 50 parts nickel. However, optimum properties are obtained when starting with about 50 parts cobalt and about 25 parts nickel. The ratio of 2 parts cobalt to 1 part nickel is the ratio of metal atoms found in the spinel. In addition to providing improved electrochemical properties, the ratio of 2 parts cobalt to 1 part nickel provides greater stability and better resistance to corrosion.

The temperatures employed in heat treating the structures can be varied over fairly wide ranges, with the temperatures of the treatment providing modifications in the electrode structure. Thus, it has been found that temperatures can be employed ranging from about 300–900° C. Preferably, in the preparation of the electrode structure, the heat treatment is performed in steps, although it is not completely necessary, with the first heating step at a temperature of from about 300–900° C. and the second heating step being from about 300–750° C. Apparently, the catalyst film on the electrode surface, formed at lower temperatures, is thinner than that formed at high temperatures. Thus, depending upon the results desired and the end use of the electrode, the heat treatment can be varied advantageously. The oxidation can be performed in an atmosphere of air, or in a mixture of air and inert gas or air containing steam. Further, the sintering of the powders can be carried out in various reducing atmospheres such as hydrogen or forming gas. The selection of the proper conditions is within the ability of one skilled in the art. It is apparent, however, that for the desired results, the spinel must be formed.

The duration of the heat treatment can also be modified, depending upon the extent of sintering desired and the temperature employed; thus, if a relatively high temperature is selected for the heat treatment, the treatment can be carried out for a relatively short period of time, whereas if a lower temperature is chosen, the duration of the heat treatment will be increased.

Compacting methods used in the formation of the instant electrodes are those known in the art and include the use of both pressure and vibratory techniques. In employing the pressure method, it is possible to vary the pressure over a relatively wide range. For example, powdered spinels of nickel and cobalt can be pressed at pressures as low as 400 p.s.i. and as high as 40,000 p.s.i. However, ordinarily, the pressures employed will range from about 1,000 to about 8,000 p.s.i., depending in part upon the sintering temperatures.

The hydroxide mixtures of nickel and cobalt can be formed from any of the soluble salts such as the chlorides, nitrates, sulphates, and the carbonates. The concentrations of the solutions are not critical, but can be adjusted as is expedient to control particle size.

Having described the invention in general terms, the following examples are set forth to more particularly illustrate preferred embodiments of the invention. Parts are by weight unless otherwise specified.

EXAMPLE I 262.8 parts of $NiSO_4 \cdot 6H_2O$ were mixed with 475.9 parts of $CoCl_2 \cdot 6H_2O$ and dissolved in water. The salts were converted to the hydroxide by adding aqueous potassium hydroxide until alkaline. The resultant magma was filtered and washed until free from sulphites and sulphates. The precipitate was dried overnight at 120° C. The dried cake was pulverized and placed in a muffle furnace at 800° C. for two hours. The cake was cooled to room tempearture and again heated at 420° C. for two hours. An X-ray diffraction pattern of the material was made using a Debje-Scherra camera. The pattern established the presence of substantial amounts of $NiCo_2O_4$. The resultant black powder was compressed at 600 p.s.i. pressure to form a plate which was used in a fuel cell system as a porous oxygen electrode. The electrode demonstrated good electromechanical performance characteristics.

EXAMPLE II

A cobalt/nickel oxide electrode is prepared as follows: a ring with a 0.20″ lip is pressed over an alumina coated disc and powdered nickel having a particle size of from 5–8 microns in diameter is placed on the disc. The disc is laterally vibrated on a vibrator at an amplitude of 0.006″ for three minutes. The disc is then sintered in an inclined retort furnace at a temperature of 1300° F. for 45 minutes in at atmosphere of hydrogen. The resultant structure is substantially homo-porous.

The homo-porous structure is washed in acetone and dried in a vacuum oven. The structure is placed in a bell jar and evacuated to less than 25 microns pressure. A 7 to 3 cobalt to nickel nitrate solution is introduced into the bell jar until it covers the homo-porous structure. The solution was allowed to impregnate the structure for 30 minutes at which time all bubbling had ceased. The structure was placed in a pre-heat zone of a furnace for 5 minutes and thereafter heated to 550° C. with the temperature being maintained for 45 minutes in the presence of air. The structure was thereafter allowed to cool in an atmosphere of air. An X-ray pattern of the material demonstrates that the structure contains an active surface substantially completely of $Co_2NiO_4$, i.e., the cobalt atoms, in relation to the nickel atoms, being present at approximately a 2 to 1 ratio. The structure, when used in a fuel cell system as an oxygen electrode demonstrated excellent electrochemical performance characteristics.

EXAMPLE III

An electrode was prepared substantially as described in Example II except that the nickel-cobalt nitrate solution was replaced by a cobalt solution. It was found by X-ray diffraction that the resultant structure after oxidation had and active surface of $NiCo_2O_4$. This electrode demonstrated excellent properties as an oxygen electrode in a fuel cell system.

The presently described electrodes can be employed as homo-porous or bi-porous electrodes. However, the electrodes are most useful as bi-porous structures having the large pores fronting the gas feed of a fuel cell or gas takeoff of an electrolytic cell and having smaller pores on the electrolytic side, thus, avoiding blocking and flooding of the electrode structure. Although the above examples indicate that the electrode is disposed of in a fuel cell, it has application in other electrochemical devices such as an electrolytic cell.

While various embodiments of the invention are set forth, the invention is not to be construed as being limited thereby. It is possible to produce still other embodiments without departing from the inventive concept herein disclosed. Such modifications are within the ability of one skilled in the art.

It is claimed:

1. An electrochemical device comprising as essential elements at least two electrodes separated by an electrolyte compartment containing electrolyte, at least one of said electrodes being non-consumable and comprising a structure having a catalytically active surface, the catalyst of said catalytically active surface consisting essentially of $NiCo_2O_4$ spinel.

2. A fuel cell comprising a fuel electrode, an oxidant electrode, and an electrolyte compartment containing electrolyte separating said electrodes, at least one of said electrodes comprising a structure having a catalytically active surface, the catalyst of said catalytically active surface consisting essentially of $NiCo_2O_4$ spinel.

3. The fuel cell of claim 2 wherein the oxidant electrode comprises a structure having a catalytically active surface, the catalyst of said catalytically active surface consisting essentially of $NiCo_2O_4$ spinel.

References Cited

UNITED STATES PATENTS

| | | | |
|---|---|---|---|
| 704,304 | 7/1902 | Edison | 136—24 |
| 1,442,238 | 1/1923 | Smith | 136—24 |
| 2,175,523 | 10/1939 | Greger | 136—86 |
| 2,520,181 | 8/1950 | Teter et al. | |
| 2,716,670 | 8/1955 | Bacon | 136—120 X |
| 3,032,515 | 5/1962 | Hinsvark | 252—472 X |
| 3,069,469 | 12/1962 | Wilkes | 252—472 X |
| 3,116,169 | 12/1963 | Thompson | 136—86 |
| 3,167,457 | 1/1965 | Bacon et al. | 136—120 |
| 2,669,598 | 2/1954 | Marko et al. | 136—122 |

WINSTON A. DOUGLAS, Primary Examiner

A. SKAPARS, Assistant Examiner

U.S. Cl. X.R.

136—120; 204—242, 290